United States Patent [19]

Saito

[11] Patent Number: 4,851,940

[45] Date of Patent: Jul. 25, 1989

[54] LONGITUDINAL RECORDING AND/OR REPRODUCING APPARATUS

[75] Inventor: Etsuro Saito, Kanagawa, Japan

[73] Assignee: Sony Corporation, Tokyo, Japan

[21] Appl. No.: 76,718

[22] Filed: Jul. 23, 1987

[30] Foreign Application Priority Data

Aug. 6, 1986 [JP] Japan .................................. 61-184522

[51] Int. Cl.$^4$ .............................................. G11B 5/027
[52] U.S. Cl. ...................................... 360/84; 360/107; 360/70
[58] Field of Search ................................... 360/84–85, 360/107, 70

[56] References Cited

U.S. PATENT DOCUMENTS 4,040,109  8/1977  Kryltsor .............................. 360/107

Primary Examiner—A. J. Heinz
Attorney, Agent, or Firm—Ronald P. Kananen

[57] ABSTRACT

A parallel scanning tape recording and/or reproducing apparatus includes a rotary head drum carrying a magnetic head which forms a given length of recording track on a magnetic tape. The magnetic head is designed to be shifted in axial direction at every cycle of recording and/or reproducing operation for forming a plurality of tracks which tracks are axially aligned to form a series of track trains which are formed at mutually different lateral orientation on the magnetic tape. The recording and/or reproducing apparatus is responsive to an operation command which includes an order for deceleration of the magnetic tape to stop, such as a command for reversing the tape drive direction, to temporarily accelerate tape drive speed for avoiding overlapping of axially aligned tracks.

12 Claims, 14 Drawing Sheets

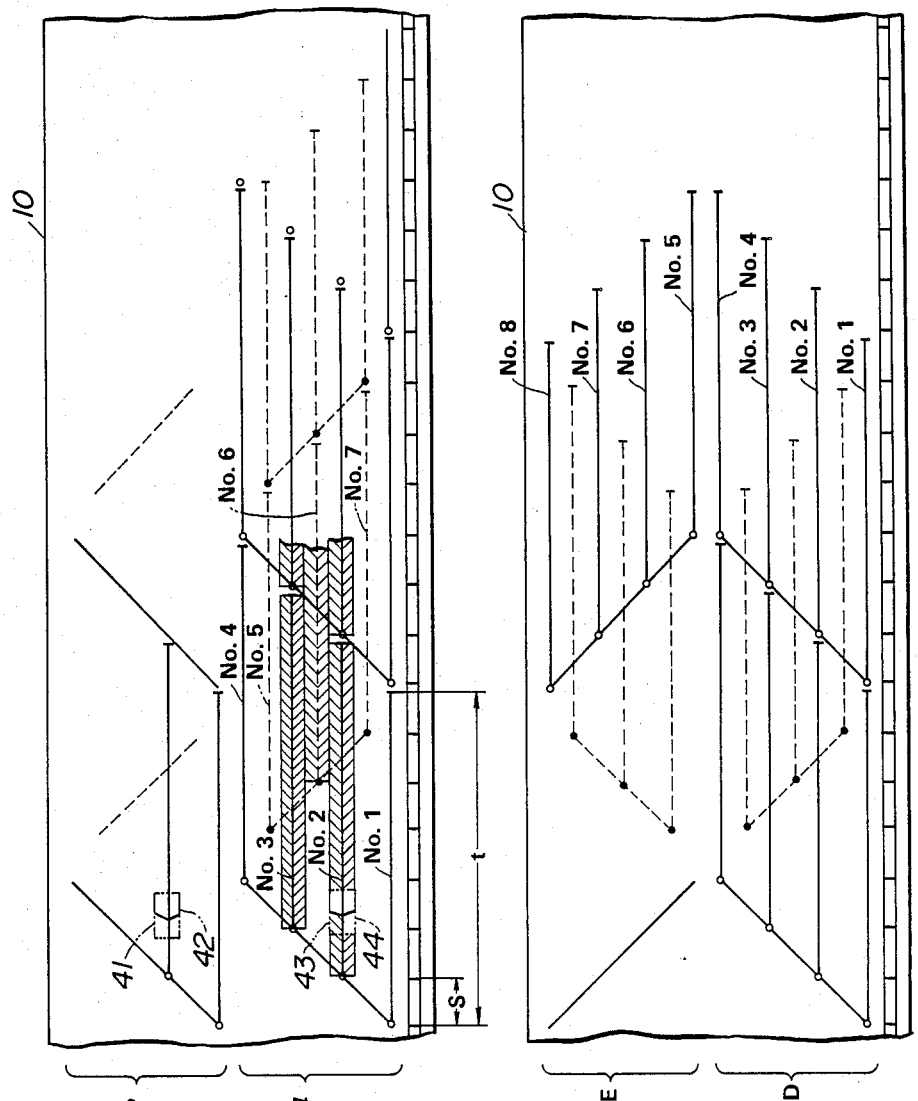

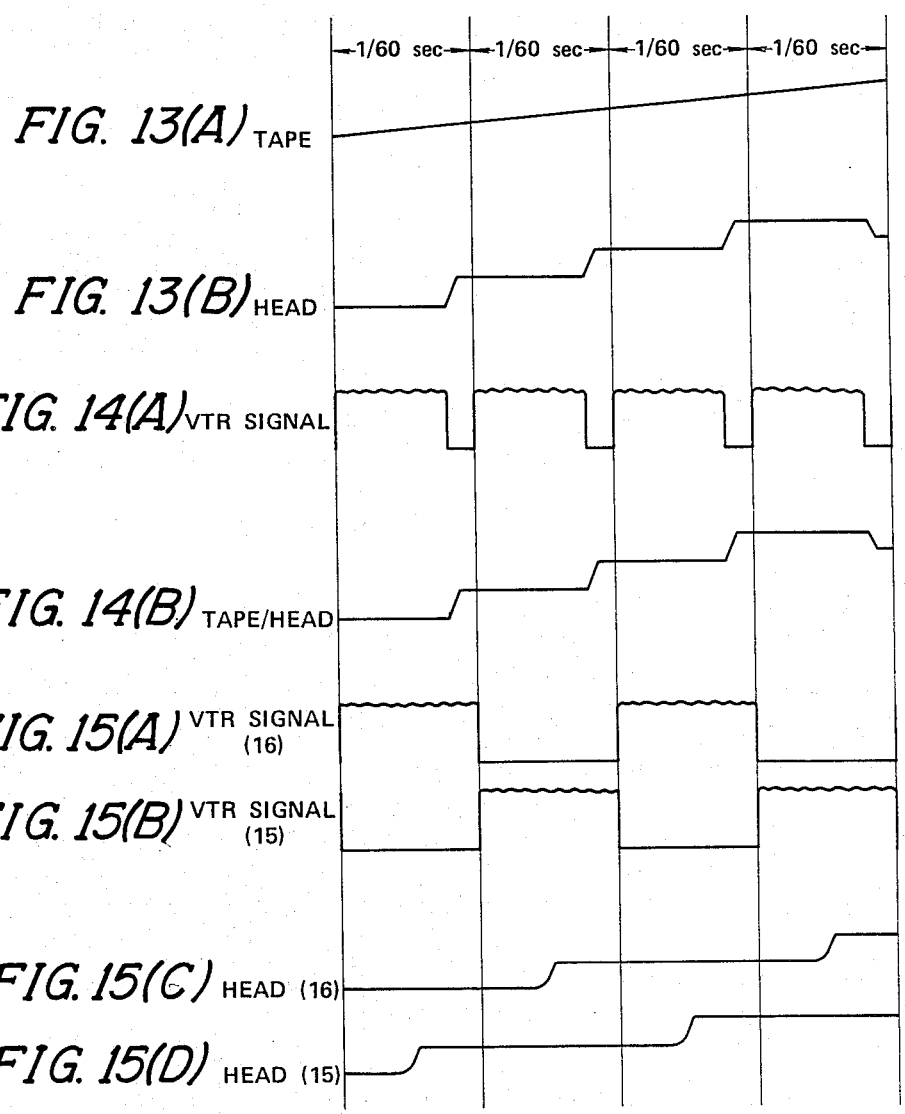

LONGITUDINAL RECORDING AND/OR REPRODUCING APPARATUS

BACKGROUND OF THE INVENTION

1. Field of the Invention

The present invention relates generally to a recording and/or reproducing apparatus for recording and/or reproducing information on recording tracks which are formed longitudinally in parallel to a longitudinal direction of the tape. More particularly, the invention relates to a technique for preventing the longitudinally formed recording tracks from overlapping with the adjacent tracks upon changing the running direction of the tape in the recording and/or reproducing apparatus.

2. Description of the Background Art

In a conventional rotary scanning type recording and/or reproducing apparatus having a rotary head drum, such as a video tape recorder (VTR), or digital audio tape (DAT) player, a helical recording system has been employed. In this helical recording system, a magnetic tape is wrapped around the rotary head drums in a helical fashion for recording and/or reproducing information on skewed recording tracks formed on a magnetic tape. Such helical scanning type recording system has been known to allow high density recording.

In such helical scanning type recording and reproducing apparatus, the skewed recording track tends to be formed in an overlapping fashion with the adjacent track due to a difference of relative speed between the magnetic tape and the rotary head drum upon deceleration of the magnetic tape speed.

On the other hand, the other type of rotary scanning system has been proposed to form the recording tracks in parallel to the longitudinal direction of the magnetic tape for recording and/or reproducing information on the recording tracks by means of the rotary head drum. This parallel scanning type recording system has been proposed in the U.S. Pat. No. 4,040,109, issued on Aug. 2, 1977, to Igor Alexervich Kryltosov. Such recording systems are known as a "parallel scanning type recording system" or a "longitudinal recording system". This parallel scanning type recording system is advantageous since it allows bidirectional recording and reproduction for recording and reproducing information in both forward and reverse directions of the tape run. Even for such parallel scanning type recording systems, the same problem tends to occur in a parallel scanning type recording and reproducing apparatus. In this parallel scanning type recording system, the recording tracks are formed in parallel to the longitudinal direction of the tape. Therefore, the positions of the recording tracks in the tape width direction will not changed even when the tape speed is decelerated. However, the distance between the ends of the longitudinally aligned tracks tends to be varied depending upon the relative speed between the rotary head drum rotation speed and the tape speed. Therefore, recording track overlapping between the longitudinally aligned tracks tends to occur due to a difference of the relative speed of the rotary head drum and the magnetic tape. On the other hand, deceleration of tape speed necessarily occurs upon reversing the tape drive direction or when stopping the tape drive. Overlapping of the longitudinally aligned tracks leads to discontinuous recorded information due to erasure of information on one of the overlapping tracks.

SUMMARY OF THE INVENTION

Therefore, it is an object of the present invention to provide a parallel scanning type recording and/or reproducing apparatus which can avoid overlapping between longitudinally aligned adjacent recording tracks.

In order to accomplish the aforementioned and other objects, a parallel scanning tape recording and/or reproducing apparatus, according to the present invention, includes a rotary head drum carrying a magnetic head which forms a given length of recording track on a magnetic tape. The magnetic head is designed to be shifted in an axial direction of the rotary head drum at every cycle of recording and/or reproducing operation for forming a plurality of tracks which are aligned to form a series of track trains which are formed at mutually different lateral orientations on the magnetic tape. The recording and/or reproducing apparatus is responsive to an operation command which includes an order for deceleration of the magnetic tape to stop, such as a command for reversing the tape drive direction, to temporarily accelerate tape drive speed for avoiding overlapping of aligned recording tracks.

According to one aspect of the invention, a parallel scanning tape recording and/or reproducing apparatus comprises a rotary head drum for guiding a magnetic tape on an outer periphery thereof, magnetic transducer means provided at the rotary head drum so as to project from the outer periphery of the rotary head drum, means for periodically shifting the magnetic transducer means along with an axis of the rotary head drum in order to form a plurality of recording tracks substantially parallel to a longitudinal axis of the magnetic tape, and means for driving the magnetic tape in both forward and reverse directions, wherein the magnetic tape driving means accelerates the magnetic tape for a given period from a predetermined constant speed when the magnetic tape is started to change the running direction during a recording and/or reproducing operation by the magnetic transducer means.

According to another aspect of the invention, a parallel scanning tape recording and/or reproducing apparatus comprises a rotary head drum for guiding a magnetic tape on an outer periphery thereof, magnetic transducer means provided at the rotary head drum so as to project from the outer periphery of the rotary head drum, means for periodically shifting the magnetic transducer means along with an axis of the rotary head drum in order to form a plurality of recording tracks substantially parallel to a longitudinal axis of the magnetic tape, and means for driving the magnetic tape to both forward and reverse directions, the magnetic tape driving means being responsive to an operation command including an order for stopping the magnetic tape and temporarily accelerating the magnetic tape for a given period from a predetermined constant speed in response to the operation command upon transition for decelerating the magnetic tape to stop.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiments but are for explanation and understanding only.

In the drawings:

FIG. 11 is an illustration showing one example of a longitudinal recording track pattern to be formed on a magnetic tape;

FIG. 12 is an illustration showing another example of a longitudinal recording track pattern to be formed on the magnetic tape;

FIGS. 13(A) and 13(B) depict a graph showing a relationship between the magnetic tape and magnetic head positions in a sequential tape run;

FIGS. 14(A) and 14(B) show a graph showing a relationship between the video signal and tape head position, in an intermittent tape run;

FIGS. 15(A), 15(B), 15(C) and 15(D) show a relationship between video signals to be recorded by means of first and second heads respectively, and head positions of the first and second heads, in an intermittent tape run;

DESCRIPTION OF THE PREFERRED EMBODIMENTS

Figure 1:
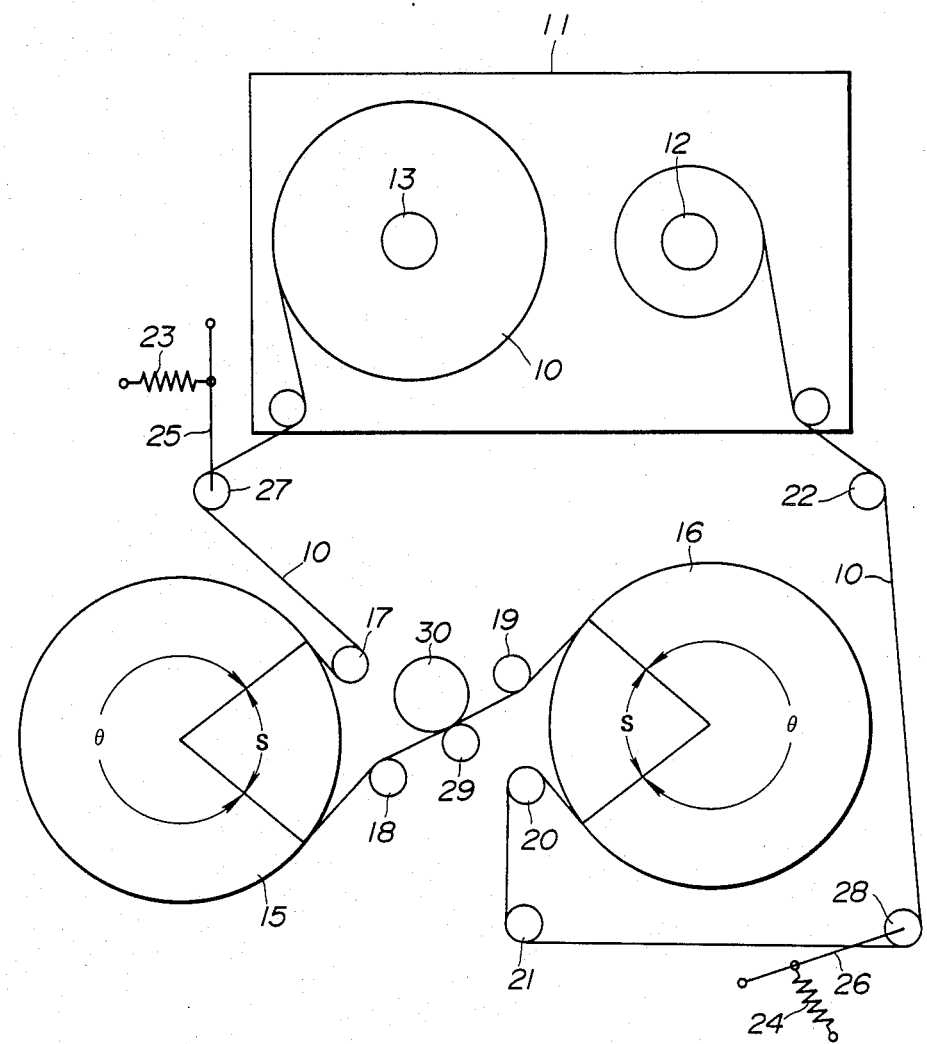
FIG. 1 is a diagramatic illustration of the preferred embodiment of a longitudinal recording and/or reproducing apparatus with a dual-drum arrangement, according to the present invention.
Figure 2:
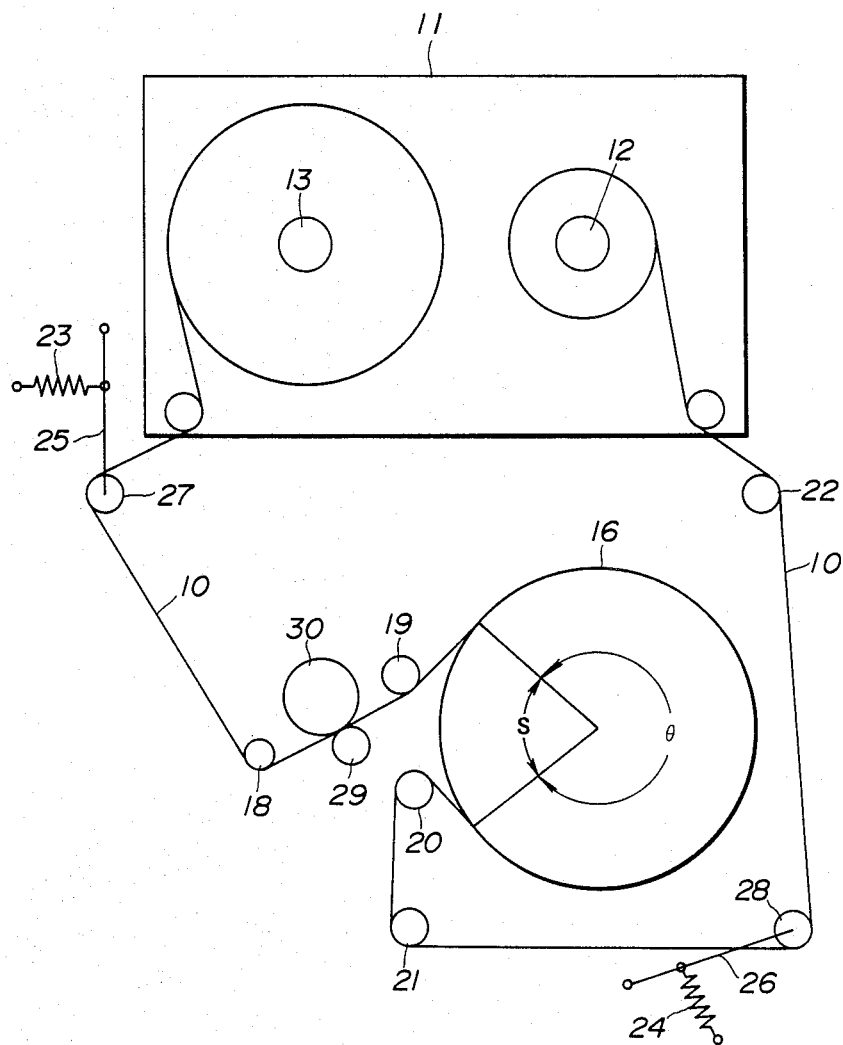
FIG. 2 is a diagramatic illustration of the preferred embodiment of a longitudinal recording and/or reproducing apparatus with a single-drum arrangement, according to the present invention.

Referring now to the drawings, particularly to FIGS. 1 and 2, there are diagramatically illustrated the preferred embodiments of a longitudinal recording and/or reproducing apparatus according to the present invention. The shown embodiment of the longitudinal recording and/or reproducing apparatus is employed in a VTR. A tape cassette 11 containing a tape 10 is used for longitudinal recording. The tape cassette 11 has a supply reel 12 and take-up reel 13. The tape 10 is wound around the supply reel 12 and the take-up reel 13 at each end. When this tape cassette 11 is loaded on the preferred embodiment of the longitudinal recording and/or reproducing apparatus, the tape 10 is wrapped around the first and second head drums 15 and 16. For loading the tape 10 onto the first and second head drums 15 and 16, and for defining the tape path, tape guides 17, 18, 19, 20 and 21 are provided. Adjacent to the tape path, tension levers 25 and 26 also are provided. The tension levers 25 and 26 are biased by means of coil springs 23 and 24 so as to provide tension to the tape 10. The tension levers 25 and 26 are pivoted at one end and carry tape guides 27 and 28 at the other ends. Therefore, the tape guides 27 and 28 bias the tape for adjusting tension on the tape 10 to be constant. In the vicinity of the tape path between the first and second head drums 15 and 16, a capstan 29 and a pinch roller 30 are provided for driving the tape 10.

In this arrangement, the second head drum 16 mates with the front surface of the tape 10 for recording or reproducing the video signal on the peripheral surface. On the other hand, the first head drum 15 mates with the back side of the tape 10 for performing recording and reproducing of the video signal on the back side. It should be appreciated that, when back side recording is unnecessary, a single head drum can be used as shown in FIG. 2. In this case, the head drum 15 and the tape guide 17 can be omitted.

Figure 3:
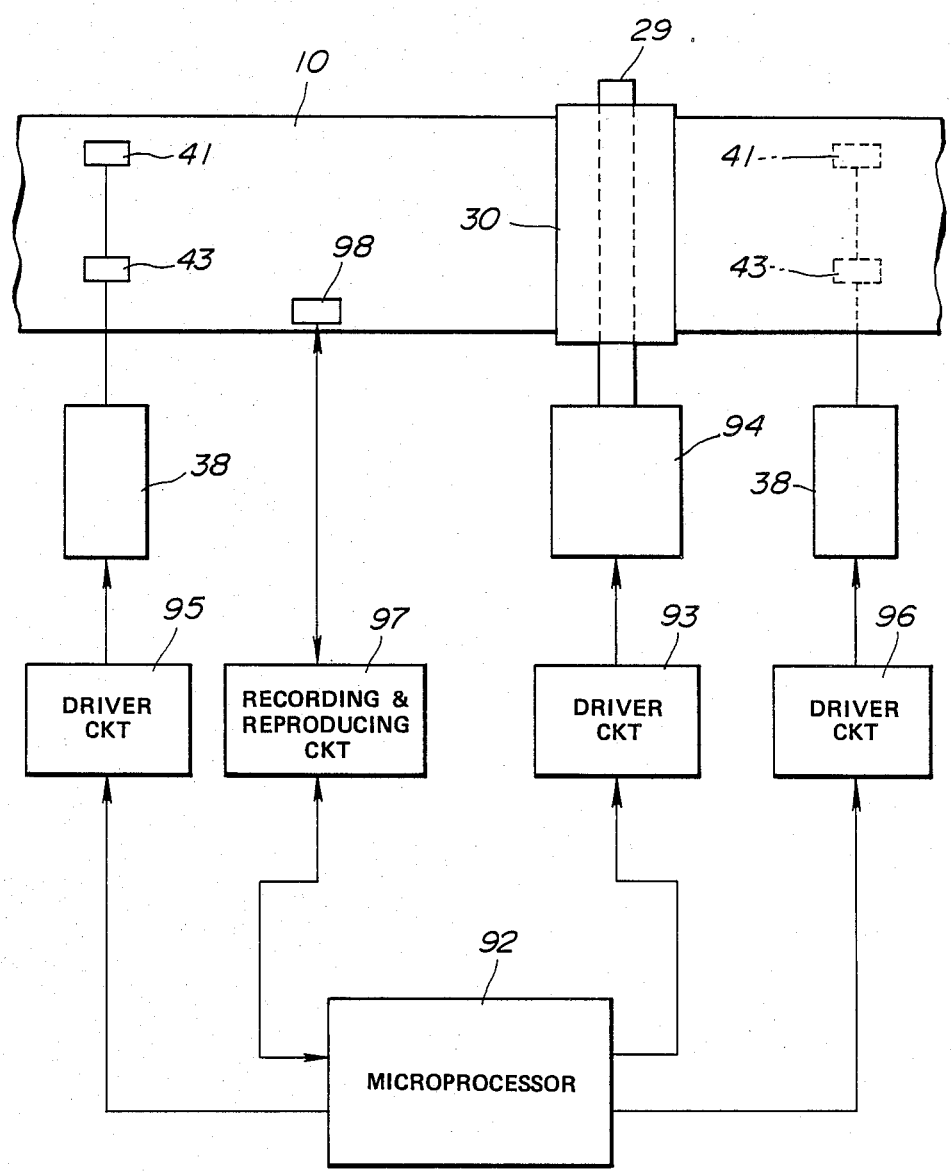
FIGS. 3 and 4 are block diagrams of capstan control circuits respectively adapted to control capstan speed in the recording and/reproducing apparatus of FIGS. 1 and 2.

FIG. 3 shows a control circuit 92 for capstan drive circuit for controlling rotation speed of the capstan 29 by controlling revolution speed of a capstan drive motor 94. The control circuit 92 comprises a microprocessor for producing a capstan speed control signal. The capstan speed control signal of the control circuit 92 is fed to a capstan driver circuit 93. The capstan driver circuit 93 supplies a drive signal to the capstan drive motor 94 for driving the rotation speed.

The microprocessor based control circuit 92 is responsive to a reverse drive command, a tape drive stop command, and so forth, which requires deceleration of the capstan speed, for temporarily outputting a capstan speed acceleration indicative control signal for a given period in order to accelerate the capstan speed and thereby accelerate the tape speed for a given period of time.

The control circuit 92 is further connected to driver circuits 95 and 96 for controlling drive speed of linear motors 38 carrying magnetic heads 41, 42 and 43, 44. In addition the control circuit 92 is connected to a recording and reproducing circuit 97 of a control head 98 for recording and reproducing a control signal.

Figure 4:
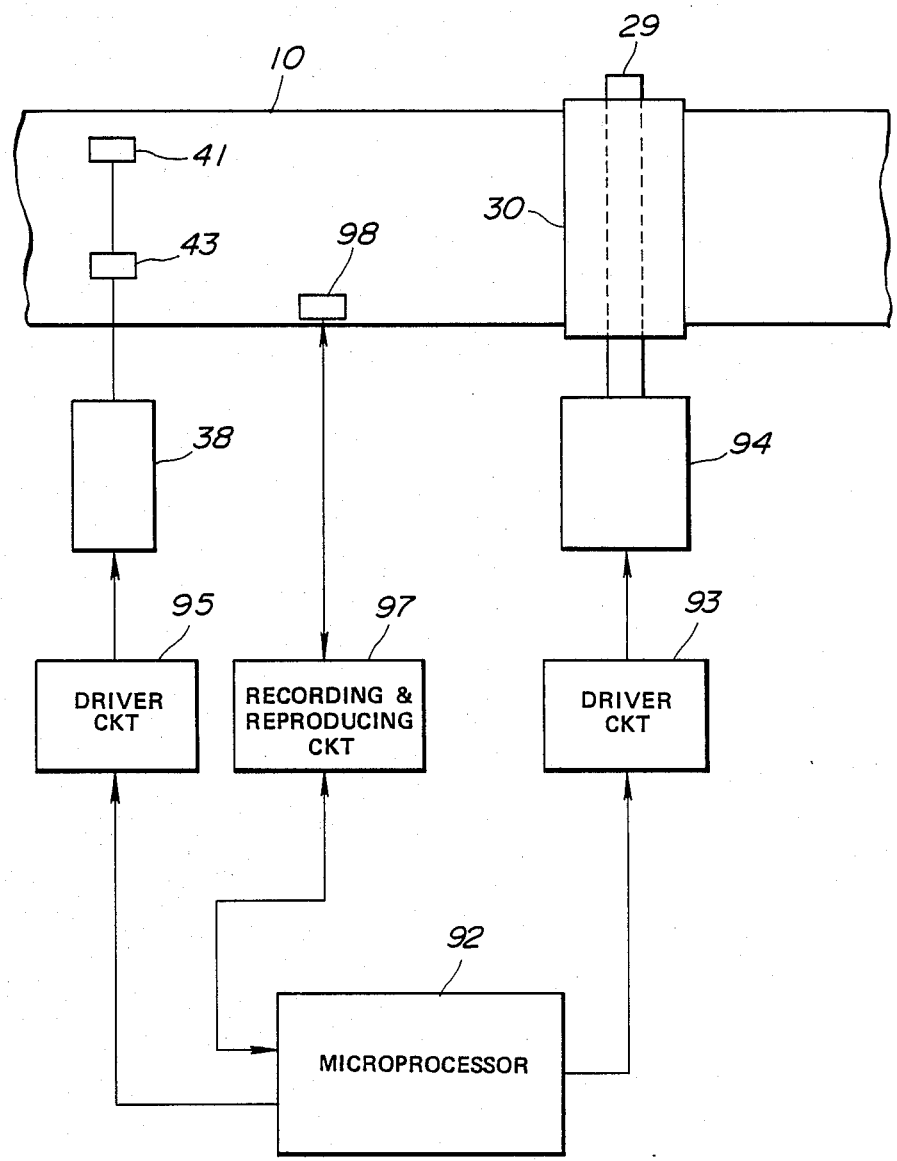

When the control circuit 92 is applied for controlling a single drum type recording and/or reproducing apparatus, the control circuit is connected to the driver circuits 93, 95 and recording and reproducing circuit 97 for driving the capstan drive motor 94 and the linear motor 38 of the single rotary head drum 15 as shown in FIG. 4.

Figure 5:
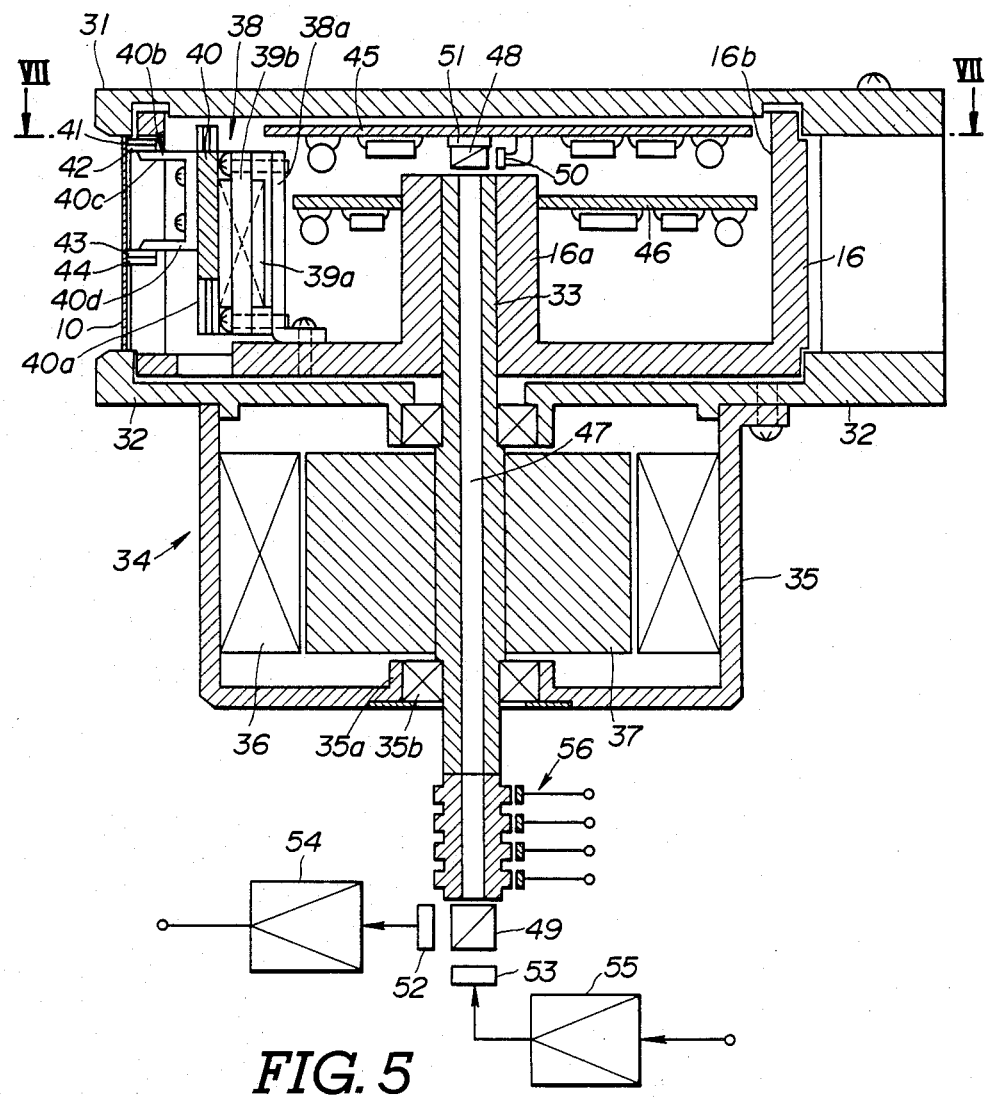
FIG. 5 is a cross-section of a rotary head drum to be employed in the preferred embodiments of the longitudinal recording and/or reproducing apparatus of FIGS. 1 and 2.
Figure 7:
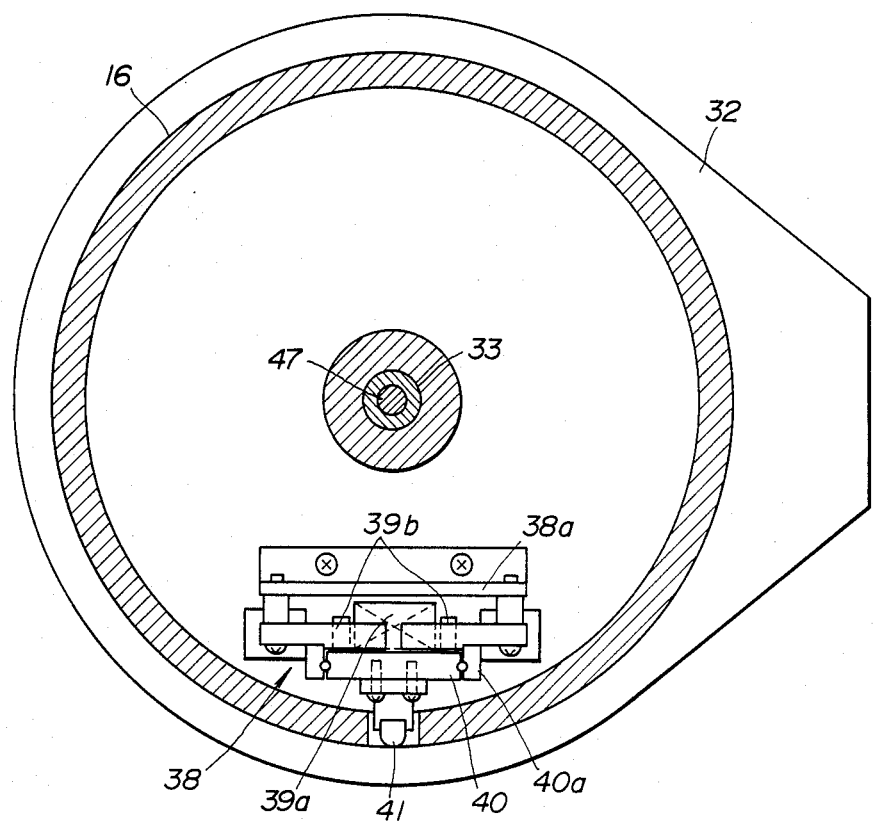
FIG. 7 is a section taken along line VII—VII of FIG. 5.

FIG. 5 and FIG. 7 show the detailed construction of the rotary head drum 16 suitable to be employed in the preferred embodiments of the longitudinal recording and/or reproducing apparatus of FIGS. 1 and 2, the construction of which is also suitable for the rotary head drum 15. The head drum 16 is sandwiched between flange guides 31 and 32. The flange guides 31 and 32 define the tape run path adjacent the rotary head drum 16. The rotary head drum 16 has an inner cylindrical section 16a fixedly mounted at the top of a hollow cylindrical rotary shaft 33. The rotary shaft 33 serves as an output shaft of a motor 34. The motor 34 has a motor housing 35. A boss 35a with a bearing 35b is formed at the bottom of the motor housing 35 in order to rotatably receive the rotary shaft 33. The motor housing 35 houses a stator coil 36 and a rotor magnet 37 in a coaxial relationship to each other. The rotor magnet 37 is fixed to the rotary shaft 33 so as to rotate therewith. Therefore, the rotary shaft 33 is rotatingly driven by means of the motor 34 in order to rotate the rotary head drum 16.

The rotary head drum 16 defines an annular groove 16b. The linear motor 38 is housed within the annular groove 16b. The linear motor 38 is fixedly mounted on the rotary head drum 16 by means of a mounting bracket 38a which is fixed to the bottom of the rotary head drum 16. The linear motor 38 comprises an electromagnetic coil 39a and a stator core 39b. A movement 40 is also disposed within the annular groove 16b adjacent the linear motor 38. The movement 40 is coupled to the linear motor 38 so as to be driven by the latter to move with respect to the stator core. The movement 40 is mounted on a guide 40a which extends in parallel to the rotation axis of the rotary head drum 16. Therefore, the movement 40 is guided by the guide 40a to cause thrusting movement in the axial direction.

A head support bracket 40b is fixedly mounted on the movement 40. The head support bracket 40b has a pair of radially extending legs 40c and 40d. A pair of magnetic heads 41 and 42 are mounted on the leg 40c and another pair of magnetic heads 43 and 44 are mounted on the leg 40d. Pairs of magnetic heads 41, 42 and 43 44 respectively forms azimuth-pair-heads. These two azimuth-pair-heads are axially aligned with each other.

Figure 6:
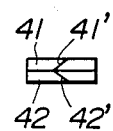
FIG. 6 is a front view of an azimuth-pair-head to be employed in the preferred embodiment of the longitudinal recording and/or reproducing apparatus.

As shown in FIG. 6, the magnetic heads 41 and 42 forming one azimuth-pair-head have azimuth gaps 41' and 42' of mutually different azimuth angles. Similarly, the magnetic heads 43 and 44 form azimuth-pair-head of substantially identical construction as that of the azimuth-pair head formed by the magnetic heads 41 and 42.

A pair of upper and lower circuit boards 45 and 46 are also disposed within the annular groove 16b. The upper circuit board 45 is connected to the magnetic heads 41, 42, 43 and 44 and contains a serial-to-parallel converter circuit. On the other hand, the lower circuit board 46 contains a drive circuit for the aforementioned linear motor 38.

As shown in FIGS. 5 and 7, a photo-coupling 47 formed of a light-conductive material, is inserted through the axially extending hollow space of the rotary shaft 33. This photo-coupling 47 is designed for transmitting video signal data therethrough. The photo-coupling 47 opposes prisms 48 and 49 at both ends thereof. A light emitting element 50 and a light sensing element 51 are provided in the vicinity of the the prism 48. Similarly, a light emitting element 53 and a light sensing element 52 are provided in the vicinity of the the prism 49. The light emitting element 53 and the light sensing element 53 are connected to amplifiers 54 and 55 respectively.

Slip rings 56 are provided in the vicinity of the lower end of the rotary shaft 33. The slip rings 56 are connected to a power source to supply electric power to the circuit boards 45, 46, and the linear motor 38.

Figure 8:
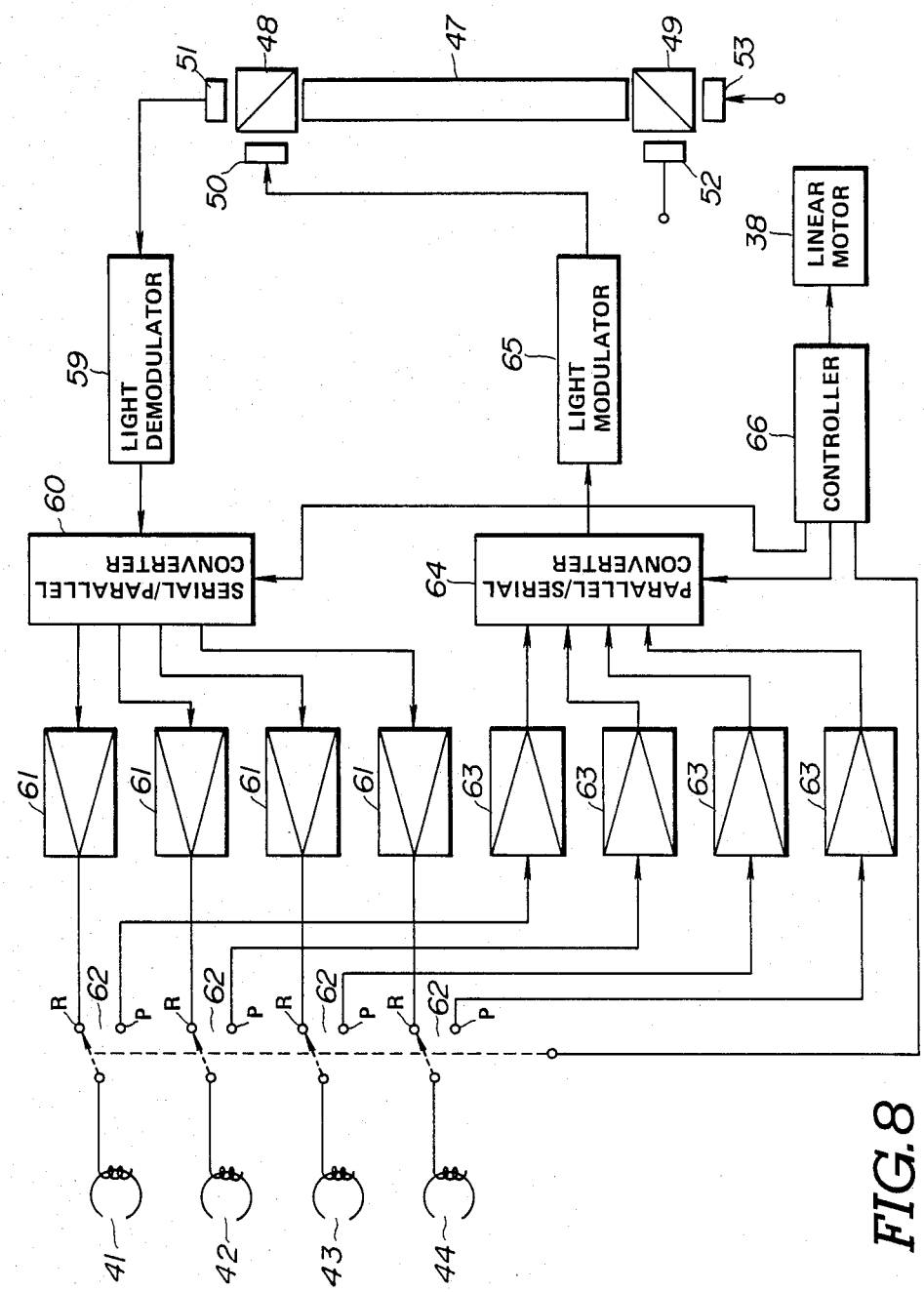
FIG. 8 is a block diagram of a signal processing circuit employed in the preferred embodiment of the longitudinal recording and/or reproducing apparatus.

FIG. 8 shows a diagram of the circuit associated with the rotary head drum 16. The light sensing element 51 is connected to a serial-to-parallel converter 60 via a light demodulator 59. The serial-to-parallel converter 60 is connected to the magnetic heads 41, 42, 43 and 44 via amplifiers 61 and recording terminals R of field switches 62. The light sensing element 51, the light demodulator 59, the serial-to-parallel converter 60, the amplifiers 61, and the field switches 62 constitute a recording circuit for recording data, such as a video signal, onto the magnetic tape.

On the other hand, the field switches 62 have reproducing terminals P. The reproducing terminals P of the field switches 62 are connected to a parallel-to-serial converter 64 via amplifiers 63. The parallel-to-serial converter 64 is connected to a light emitting element 50 via a light modulator 65. The reproducing terminals P of the field switches 62, the amplifiers 63, the parallel-to-serial converter 64, the light modulator and the light emitting element 50 constitute a reproducing circuit for reproducing data recorded on the magnetic tape.

A controller 66 is provided for controlling the positions of the field switches 62, the serial-to-parallel converter 60, the parallel-to-serial converter 64 and the linear motor 38.

Figure 9:
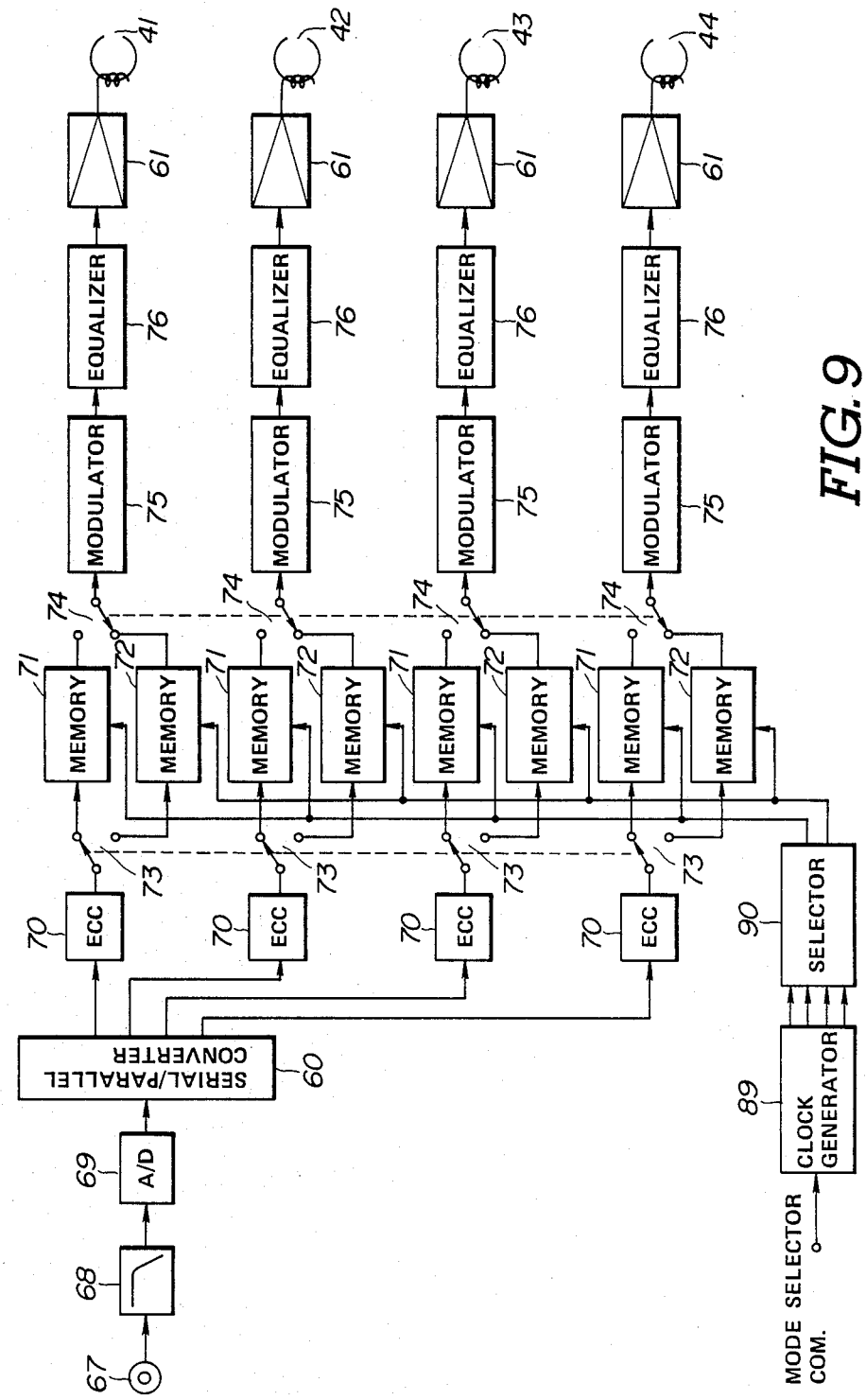
FIG. 9 is a block diagram of a recording circuit in the preferred embodiment of the longitudinal recording and/or reproducing apparatus.

FIG. 9 diagramatically and explanatorily illustrates a recording circuit in the preferred embodiment of the recording and/or reproducing apparatus. The serial-to-parallel converter 60 is connected to a data input terminal 67, such as a video input terminal, via a low-pass filter 68 and an analog-to-digital (A/D) converter 69. The outputs of the serial-to-parallel converter 60 are connected to error correction code (ECC) encoders 70. Each of the ECC encoders 70 is connected to a pair of field memories 71 and 72 via a switch 73. The field memories 71 and 72 are, in turn, connected to a modulator 75 via a switch 74. The modulator 75 is connected to its corresponding magnetic head 41, 42, 43 or 44 via an equalizer 76 and amplifier 61.

Each of the field memories 71 and 72 is connected to a clock generator 89 via a selector 90. In the shown embodiment, the clock generator 89 generates different frequencies of clock signals. The selector 90 selects one of the clock signals to supply the field memories 71 and 72. The data is written in and read from the field memories 71 and 72 based on the clock signal supplied from the selector 90.

Figure 10:
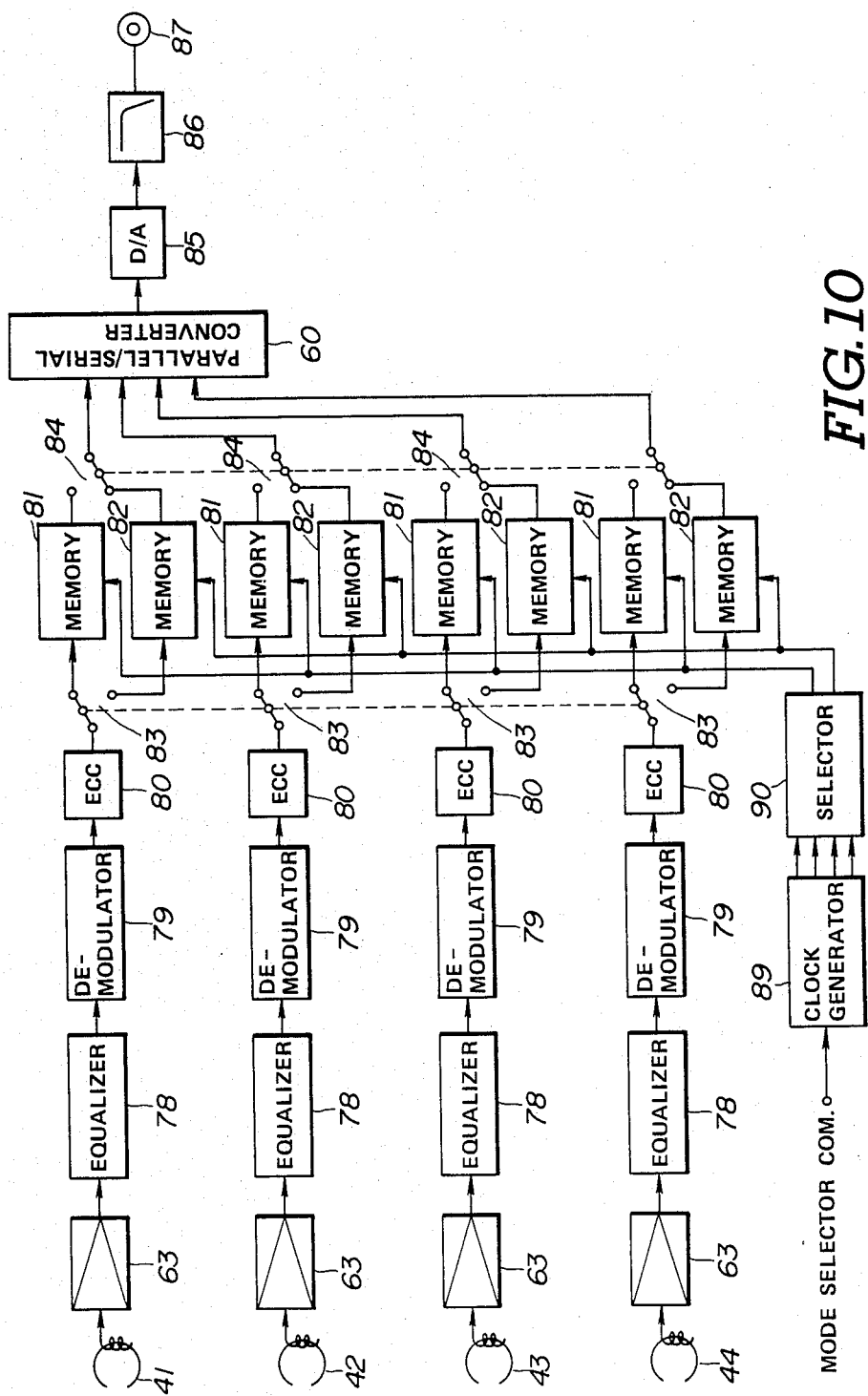
FIG. 10 is a block diagram of a reproducing circuit in the preferred embodiment of the longitudinal recording and/or reproducing apparatus.

FIG. 10 explanatorily depicts a reproducing circuit in the preferred embodiment of the recording and/or reproducing circuit according to the invention. Each of the magnetic heads 41, 42, 43 and 44 are respectively connected to a pair of field memories 81 and 82 via an associated amplifier 63, equalizer 78, demodulator 79, error correction code (ECC) demodulator 80 and switch 83. The switch 83 selectively connects the associated magnetic head 41, 42, 43 or 44 to one of the field memories 81 or 82 for writing data read from the associated magnetic head in a selected one of the field memories 81 and 82. The outputs of the field memories 81 and 82 are connected to the parallel-to-serial converter 64. The parallel-to-serial converter 64 is, in turn, connected to a data output terminal 87, such as a video output terminal, via a digital-to-analog converter 85 and a low-pass filter 86. The field memories 81 and 82 are connected to the clock generator 89 via the selector 90 to be supplied therefrom the clock signal for time base correction in writing in and reading data.

Operation of the preferred embodiment of the longitudinal or parallel scanning-type recording and/or reproducing apparatus, according to the present invention, will be described herebelow. The magnetic tape 10 in the magnetic tape cassette 11 is extracted from the cassette and wrapped onto the periphery of the rotary head drums 15 and 16. The magnetic tape 10 is not wrapped on the periphery of the rotary head drums 15 and 16 in a helical fashion to lay the tape axis oblique to the rotating direction of the drum, but in a parallel fashion to lay the tape axis in parallel to the rotating direction of the drum. As will be seen from FIG. 1, the rotary head drum 16 mates with the front surface of the magnetic tape 10. On the other hand, the rotary head drum 15 mates with the back side of the magnetic tape. Therefore, both sides of the magnetic tape 10 are scanned by means of the rotary head drums 15 and 16. As shown in FIG. 5, the magnetic heads 41, 42, 43 and 44 are arranged in alignment along the rotary axis of the rotary head drums 15 and 16. These magnetic heads 41, 42, 43 and 44 are fixedly mounted on the movement 40 which is associated with the linear motor 38 as set forth above and by which the magnetic heads 41, 42, 43 and 44 are shifted in the axial direction every scanning cycle.

It shall be noted that for the purposes of this document one scanning cycle is the period that the magnetic heads 41, 42, 43 and 44 are in contact with the tape 10 during one revolution of a rotary head drum 15 or 16.

Operation of the linear motor 38 is synchronized with rotation of the rotary head drums 15 and 16. Namely, the linear motor 38 is driven to cause axial shift of the magnetic heads at the time when the magnetic heads 41, 42, 43 and 44 are not in contact with the magnetic tape 10. As will be seen from FIG. 1, the magnetic heads 41, 42, 43 and 44 are not in contact with the magnetic tape 10 in angular position range S (approximately 90°). Therefore, axial shift of the magnetic heads 41, 42, 43 and 44 takes place while the magnetic heads are in this angular range S. As is well known, the rotary head drums 15 and 16 rotate at a speed of 1/60 sec. (16.6 msec.) per cycle. Therefore, the period of time that the magnetic head is within the angular range S is about 4.15 msec. In the preferred embodiment, the linear motor 38 is designed to perform the axial shift of the magnetic heads 41, 42, 43 and 44 in 2 msec.

In the shown embodiment, the magnetic heads 43 and 44 forming the lower azimuth-pair-head form tracks No. 1, No. 2, No. 3 and No. 4 in sequence with an axial shift upwards occuring between every scanning cycle. Conversely while shifting downwards, the magnetic heads 43 and 44 form tracks No. 5, No. 6 and No. 7 with an axial shift downwards occuring between every scanning cycle. In summary the magnetic heads 43 and 44 scan the No. 1 track first. After one scanning cycle, the magnetic heads 43 and 44 are shifted to mate with the No. 2 track to scan No. 2 track. Similarly, the magnetic heads 43 and 44 are shifted upwards once every scanning cycle to scan the No. 3 and No. 4 tracks. After reaching the No. 4 track and after one cycle of scanning on the No. 4 track, the magnetic heads 43 and 44 are shifted downwards to mate with the No. 5 track which is formed between the No. 3 and No. 4 tracks. Similarly, between very scanning cycle, the magnetic heads 43 and 44 are shifted downward to scan the No. 6 and No. 7 tracks.

Since they are rigidly mounted on the same member as magnetic heads 43 and 44, the magnetic heads 41 and 42 forming the upper azimuth-pair-head are shifted upwardly and downwardly in synchronism with axial shifting of the lower azimuth-pair-head to scan the corresponding No. 1 to No. 7 tracks formed on the upper half of the magnetic tape 10.

It should be appreciated that, during every one cycle of scan performed by the magnetic heads 41, 42, 43 and 44, one field data, i.e. one field of video data, is written in or read from the corresponding tracks.

As shown in FIG. 11, a high-density track pattern can be formed on the magnetic tape 10 with substantially no guard band between the adjacent tracks. In this case, since each pair of the magnetic heads 41, 42 and 43, 44 respectively has a different azimuth angle in relation to each other, the azimuth pattern of the upper half in each track becomes different from that in the lower half of the same track. As a result, the upper half of one track will have a different azimuth from that in the adjacent lower half of the upper adjacent track. The herring bone azimuth patterns created in the adjacent tracks successfully eliminate cross-talk between adjacent tracks. By providing differently oriented azimuth patterns in each track, high-density track formation with little or no guard band becomes possible.

The relationship between magnetic tape run and the axial shift of the magnetic heads 41, 42, 43 and 44 is explanatorily illustrated in FIG. 13. In this case, the magnetic tape 10 is fed sequentially at a constant speed. Therefore, the magnetic heads 41, 42, 43 and 44 are released from the magnetic tape 10 at the angular range S of FIG. 1. At this angular range the axial shift of the magnetic heads is executed to shift the magnetic heads to their corresponding tracks, as set forth above. On the other hand, when the magnetic tape 10 is fed intermittently, the magnetic tape 10 is intermittently stopped while the magnetic heads 41, 42, 43 and 44 mate with the corresponding tracks. Shifting of the magnetic heads in the axial direction thus intermittently occurs while the magnetic heads are in the angular range S in FIG. 1. While the magnetic heads are in the angular range S, the magnetic tape 10 is fed, as shown in FIG. 14. Furthermore, in the dual drum arrangement of FIG. 1, it would be possible to record and reproduce data on both sides of the magnetic tape alternately, as shown in FIG. 15. As will be seen from FIG. 15, in this dual side recording or reproduction, the rotary head drums 15 and 16 are activated alternately during each scanning cycle. Axial shifting of the magnetic heads occurs in each rotary head drum 15 and 16 within the interval between the active cycles.

FIG. 12 shows the track pattern formed in two directional recording, i.e. forward and reverse direction recording. It should be appreciated that two directional recording is possible in single-sided recording or double-sided recording. Single-sided recording can be performed by the recording and/or reproducing apparatus of FIG. 2. As will be seen from FIG. 2, the single-sided recording system will allow simple construction of the recording and/or reproducing apparatus. On the other hand, the double-sided recording system will provide greater capacity of recording. For single-sided recording, a single side coated magnetic tape can be used.

In two directional recording, the tracks No. 1, No. 2, No. 3 and No. 4 are formed in the same manner as that discussed with respect to FIG. 11. However, the tracks No. 1 through No. 7 and No. 8 in the upper half of the magnetic tape 10 are formed symmetrical opposite to the No. 1, No. 2, No. 3 and No. 4 tracks with respect to the longitudinal center axis of the magnetic tape. As will be seen from FIG. 12, the starting points and end points of the No. 8, No. 7, No. 6 and No. 5 tracks are axially opposed to the corresponding positions to that of No. 1, No. 2, No. 3 and No. 4 tracks. This track pattern is essential for providing a high quality of video image without causing disturbance of the recorded or reproduced image. The No. 1 to No. 4 tracks are formed in the forward direction recording or reproduction mode. On the other hand, the No. 5 to No. 8 tracks are formed in the reverse direction recording or reproduction mode. Therefore, in the shown embodiment, the data is recorded in the No. 1, No. 2, No. 3 and No. 4 tracks and reproduced therefrom, while the magnetic tape 10 is fed in forward direction. On the other hand, while the magnetic tape is fed in reverse direction, recording and reproduction is performed with respect to the No. 5, No. 6, No. 7 and No. 8 tracks. As will be appreciated, in this case, the last track, i.e. No. 4 track in the forward recording is formed adjacent the first track, i.e. No. 5 track of the reverse direction recording. As set forth, the start and end points of the No. 4 and No. 5 tracks are longitudinally at the same positions. This arrangement is particularly advantageous for providing a time-margin for reversing the tape feeding direction. Furthermore, this arrangement makes a servo control for the capstan easier. The track pattern of FIG. 12 is advantageously employed in the shown embodiment to perform recording and reproduction without causing disruption of the signal when reversing the tape running direction.

Hereinafter will be discussed a manner of forming longitudinal tracks upon reversing of the tape driving directions. Especially, the following discussion is directed to formation of the longitudinal tracks during reversing of the tape drive direction in automatic reverse mode operation. In the transition state to reverse the tape drive direction, the tape speed in one direction has to be decelerated to zero for reversing the tape drive direction to the other direction. During this deceleration period, the relative speed of the rotary head drums 15 and 16 to the tape becomes higher. The relative speed difference between the rotary head drum and the magnetic tape increases as the tape speed is decelerated toward zero. As will be appreciated, if the relative speed between the rotary head drums 15 and 16 and the magnetic tape becomes different, it may cause a variation of the length of the longitudinal track to be formed. Namely, when the tape speed is decelerated to be lower, the longitudinal track length expands toward the longitudinally aligned adjacent track. When expansion of the longitudinal track length is substantial, the end point of the longitudinal track may be located at the longitudinal tape area intended to form the longitudinally aligned adjacent track. This will cause overlapping of the tracks formed on the magnetic tape. Therefore, if the longitudinal tracks are formed in the pattern similar to that in the steady state as shown in FIG. 11, overlapping of the longitudinal tracks can occur. In order to avoid overlapping of the longitudinally aligned tracks, the control circuit 92 set forth above, is active to control the tape speed by adjusting the rotation speed of the capstan 29.

Figure 16:
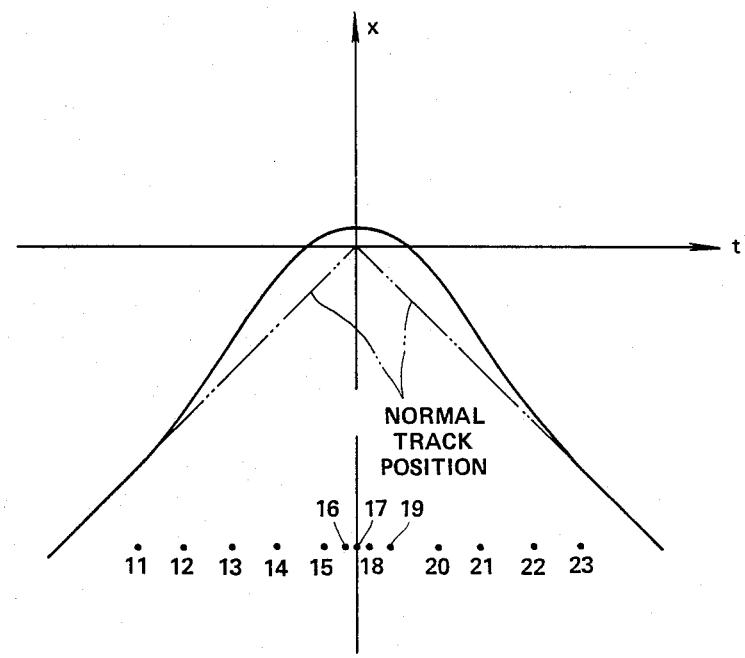
FIG. 16 is a chart showing a disposition of a tape track upon reversing the tape drive direction.
Figure 17:
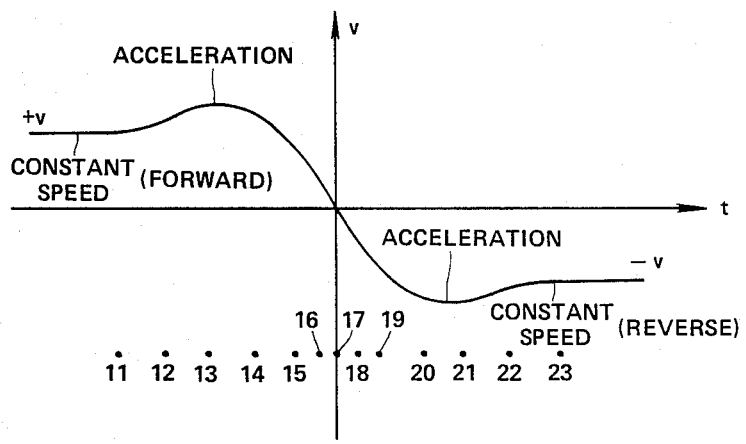
FIG. 17 is a chart showing a variation of the tape speed in the transition in reversing the tape running direction.

In order to facilitate an automatic reverse function, a reverse command is recorded on the magnetic tape 10 by means of the control head 98 immediately before the tape drive direction reverse point. In the reproduction, the control circuit 92 is responsive to the reverse command to perform a predetermined transition process to adjust the track positions as shown in FIG. 16. In order to achieve this, the control circuit 92 adjusts the capstan speed as shown in FIG. 17. Namely, immediately preceding the reversing point where the tape speed becomes zero, the control circuit 92 outputs the tape drive control signal to temporarily accelerate the capstan speed. The control circuit 92 further accelerates the rotation speed of the capstan which is driven in a reverse direction temporarily at a speed higher than the normal speed according to the characteristics of FIG. 17. Such capstan speed control at the transition causes shifting of the longitudinal track end point and the track start point to successfully prevent the track end section and track start point of the longitudinally aligned adjacent tracks from overlapping.

Figure 18:
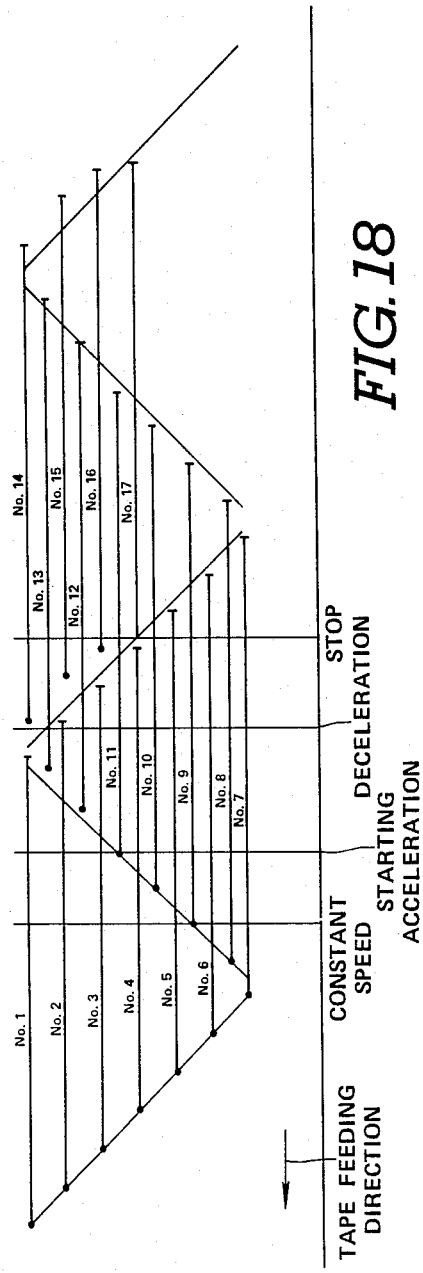
FIG. 18 is an illustration of the track pattern to be formed upon reversing a tape drive direction.
Figure 19:
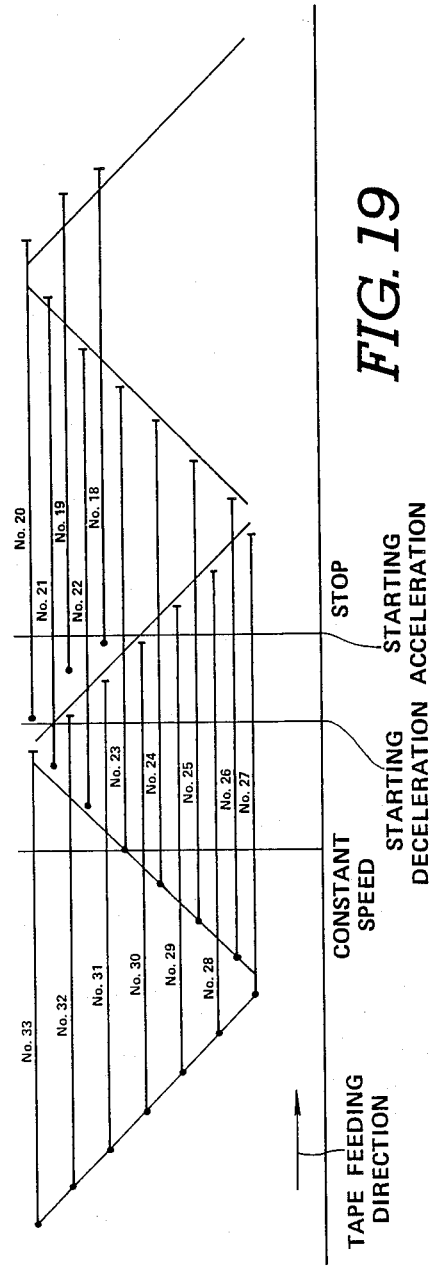
FIG. 19 is an illustration of the track pattern to be formed in a direction opposite to the tape running direction of FIG. 18.

The track patterns to be formed during the transition period according to the capstan speed control as shown in FIGS. 16 and 17, are shown in FIGS. 18 and 19. In the track patterns of FIGS. 18 and 19, FIG. 18 shows the track pattern to be formed during the tape drive in the aforementioned one direction, and FIG. 19 shows the track pattern to be formed in the reversed direction of tape drive. In the shown pattern in FIG. 18, the tracks No. 1 to No. 10 are formed during steady drive of the tape in one direction. Upon forming the track No. 11, the control circuit 92 outputs the control signal for accelerating the tape speed to start acceleration of the tape speed. Thereafter, while the tracks Nos. 13 and 14 are formed, the tape speed is gradually decelerated. Then, upon forming the track No. 17, the tape drive direction is reversed. Immediately after reversing the tape drive direction, acceleration of the tape speed starts. The tape speed starts to be decelerated toward the normal tape speed during formation of the tracks No. 20 and 21. After completing formation of the track No. 23, the tape speed becomes stable at the normal tape speed.

Therefore, in the transition tape speed control set forth above, overlapping of the longitudinally adjacent tracks can be successfully avoided by accelerating the tape speed immediately before and after reversing of the tape drive direction. Namely, as seen from FIG. 18, the tracks No. 2 and No. 15, and the tracks No. 4 and 17 are formed in a spaced apart relationship and do not overlap to each other. In addition, as will be seen from FIG. 18, the tracks formed by the preferred embodiment of the recording and reproducing apparatus are symmetrical with respect to tape drive direction, so an automatic reverse operation can be performed favorably.

It should be appreciated that the track patterns of FIGS. 18 and 19 are formed by the recording and/or reproducing apparatus of FIG. 1 with two rotary head drums. Therefore, the track patterns of FIGS. 18 and 19 are formed at opposite sides of the magnetic tape 10. When the recording and/or reproducing apparatus with the single rotary head drum, as shown in FIG. 2, is used, the control circuit 92 of FIG. 4 should be used. In this case, the track patterns of FIGS. 18 and 19 are both formed on the same side of the magnetic tape. In this case, the tape drive direction may be reversed at the track No. 17 of FIG. 18.

On the other hand, the aforementioned transition tape speed control is applicable for stopping of the tape drive. Namely, by temporarily accelerating the tape speed before stopping tape drive, the tracks formed during transition can be shifted so as not to cause ovedrlapping of the longitudinally aligned tracks.

Figure 20:
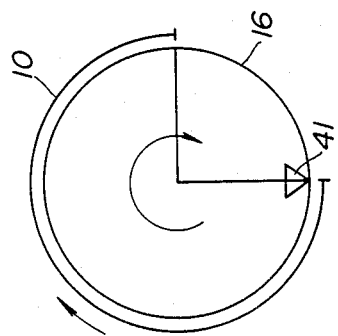
Figure 21:
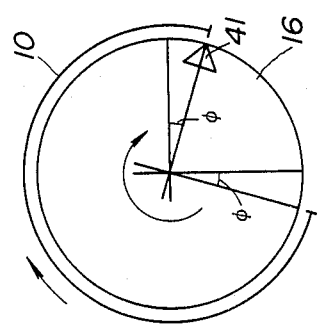

Next, hereinbelow will be discussed the relationship between the tape run direction and/or speed, and rotating direction of the rotary head drums 15 and 16. In the shown embodiment, the rotary head drum rotates in the same direction as the tape run direction in the forward running. This means that the tape run direction in the reverse run becomes opposite to the rotating direction of the rotary head drum. In the forward run of the magnetic tape, the magnetic heads 41, 42, 43 and 44 (only head 41 is shown) on the rotary head drum 16 come into contact with the magnetic tape at the position shown in FIG. 20. The magnetic head 41 maintains contact with the magnetic tape in the angular range of about 270° as shown by the arrow in FIG. 20. The magnetic head 41 separates from the magnetic tape 10 at an angular position 270° shifted from the starting position in FIG. 20. In this case, since the rotating direction of the rotary head drum 16 is same as the tape run direction in the forward mode, the relative rotation speed of the rotary head drum becomes lower to cause shortening of the track length to scan if scanning ends at 270° of the scanning start point. Therefore, the scanning end position may be angularly shifted at the angle $\phi$, therefore, the scanning continues to the position angularly advanced at the angle $\phi$ as shown in FIG. 21. Therefore, the scanning end point has to be advanced at the corresponding angle $\phi$. By advancing the scanning end points at the angle $\phi$, the track length can be maintained at about ¾ of the peripheral length ($\pi D$) of the rotary head drum.

Figure 22:
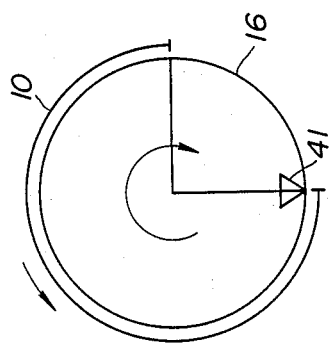
Figure 23:
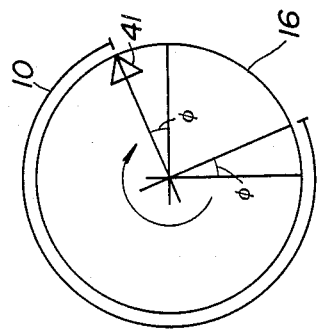

On the other hand, in the reverse direction run of the magnetic tape, the scanning of the track starts at the head position of FIG. 22. In this case, since the tape run direction is opposite to the rotating direction of the rotary head drum, the relative speed of the rotary head drum with respect to the magnetic tape become higher than the standard speed. Therefore, scanning track length become longer than ¾ of the peripheral length of the rotary head drum. This requires retarding of the scanning end position at the corresponding angle $\phi$ from the scanning end position in FIG. 22. Therefore, scanning ends at the corresponding angle $\phi$ as shown in FIG. 23 so that the magnetic head 41 can fully scan the track of the length of ¾ of the peripheral length ($\pi D$) of the rotary head drum.

Figure 24:
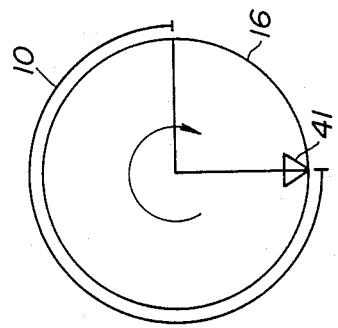
FIGS. 20 to 25 respectively show head positions at tape start and tape stop in forward and reverse modes, and at still start and stop.
Figure 25:
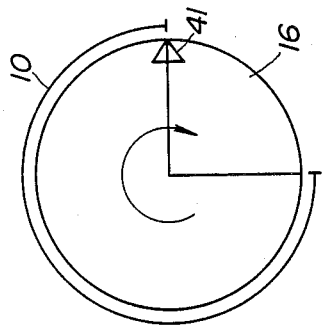

When the scanning of the track on the magnetic tape is performed in a still mode, the magnetic tape is driven intermittently, as set forth with respect to FIG. 14. Therefore, the scanning start position of the magnetic head may not be shifted either in the advancing direction and retarding direction. Therefore, the scanning start position and the scanning end position are not shifted as shown in FIGS. 24 and 25.

It should be appreciated, when tape feed speed is varied from normal speed to be an N-times higher speed than normal speed, the shifting angle can be $N\phi$ in a forward run and $-N\phi$ in a reverse run. Based on this shifting angle $\phi$ or $N\phi$, a wrapping angle $\theta$ of the magnetic tape 10 with respect to the periphery of the rotary head drum is determined.

The correction angle $\phi$ for causing angular shift of the scanning start position and the scanning end position can be determined according to the following equation:

$$S = t/n$$

where t is a track length;
  n is number of tracks formed by a single head during one cycle; and
  S is a step length.

In the shown embodiment, the number of tracks to be formed by one magnetic head in one cycle is 7. On the other hand, the track length t can be obtained by:

$$t = (\pi D - S) \times \phi/360$$

Furthermore, the step length S can also be illustrated by:

$$S = V/60$$

In this case, the correction angle $\phi$ can be illustrated by:

$$\phi = 360S/\pi D$$

where V is a tape speed; and
  D is a diameter of the rotary head drum.

Returning to FIG. 5, the signal, e.g. video signal, to be recorded on the track is transmittead through the photo coupling 47 to the rotary head drum 16. The signal is received by the circuit on the circuit board 45 and is converted into parallel data therein. This parallel data is distributed to the magnetic heads 41, 42, 43 and 44. The photo coupling 47 also transmits a control signal for the linear motor 38. The linear motor control signal transmitted through the photo coupling is picked up by the circuit on the circuit board 46. According to the control signal, the circuit board 46 controls operation of the linear motor 38. By the operation of the linear motor 38, the magnetic heads 41, 42, 43 and 44 are axially shifted to scan the tracks.

Operation of the circuit on the circuit board 45 will be described herebelow in further detail. As shown in FIG. 9, the outputs of the ECC encoders 70 are written in one of their respectively associated field memories 71 or 72. At this time, the stored data in the other field memory 72 or 71 is read out in a compressed form and applied to the associated magnetic heads 41, 42, 43 and 44 through the modulators 75, equalizers 76 and the amplifiers 61. In this case, a standard clock of the clock generator 89 is selected by the selector 90 and applied to the one of the field memories 71 or 72 into which the output data from the ECC encoder 70 is written through the switches 73. On the other hand, for the other field memory 72 or 71, a clock having higher frequency than that of the standard clock is selected by the selector and applied. The frequency of the higher frequency clock is determined according to the relative speed between the magnetic tape and the magnetic heads. Adjustment of the clock frequency to be applied to the field memory from which data is read out, helps to maintain a constant track length irrespective of variation of the correction angle $\phi$.

On the other hand, in reproduction of the recorded data on the magnetic tape, the magnetic heads 41, 42, 43 and 44 pick up data on the magnetic tape 10 and feed the field memories 81 and 82 via respectively associated amplifiers 63, the equalizers 78, demodulators 79 and ECC recoders 80 and through the switches 83 as shown in FIG. 10. The switch 83 selects one of the associated field memories 81 and 82 to write in the data transmitted from the ECC recoder 80. The write-timing for the selected one of the field memories 81 or 82 is determined by the clock applied by the selector 90. Therefore, the clock is selected by the selector so that the output data of the ECC recoder 80 can be written in the selected one of the field memory 81 or 82 within a predetermined period of time. On the other hand, the other field memory 82 or 81 is connected to the parallel-to-serial converter 64 via the switch 84 to read out the stored data. Reading of the stored data in the other field memory 82 or 81 is performed in real time. Therefore, the standard clock is selected by the selector 90 and applied thereto.

Therefore, according to the shown embodiment, the magnetic tape can be wrapped parallel to the rotating direction of the rotary head drum. This allows formation of the magnetic tape path in a single plane. Therefore, a simplified tape loading system and tape drive system can be employed for the recording and/or reproducing apparatus. Furthermore, since the tape guides for defining the tape path can be perpendicular to the tape run axis, rotary guides can be employed for smooth feeding of the tape. In addition, since the shown embodiment of the longitudinal recording and/or reproducing apparatus is designed for digital recording, influence in a reproduced video image of variation of bit-rate in recording and reproducing can be successfully avoided to allow high quality reproduced image in forward and reverse mode reproduction and in still mode reproduction. Furthermore, according to the shown embodiment, serial data transmission for the magnetic head can be employed. Additionally, in the serial data transmitted to the magnetic heads, the control signal for the head-shifting linear motor can be superimposed.

Furthermore, the longitudinal recording and/or reproducing apparatus, according to the present invention, can be adapted not only for a single drum recording and/or reproducing system but also for a dual drum system. When longitudinal recording system according to the invention is applied in a multi-drum system, dual-sided recording becomes possible significantly expanding the recording capacity of the magnetic tape. In addition, since the present invention allows dual direction recording and reproduction, trick-play becomes possible. Also, by allowing both direction recording and reproduction, access-time for the desired data can be drastically shortened.

In the shown embodiment, since the track pattern to be formed on the magnetic tape in dual direction recording is set so that the scanning start positions and scanning end positions of the mutually corresponding tracks will have the same longitudinal position, disruption of the reproduced image upon reversing tape drive direction can be completely avoided.

Also, advantages can be achieved by forming tracks by means of azimuth-pair-head consisting of a pair of magnetic heads having different azimuth angles, in that cross-talk between adjacent tracks can be successfully prevented. Furthermore, according to the invention, the first group of tracks are formed during up-shifting of the azimuth-pair-head with track-to-track intervals, each of which corresponds to the width of a track. The second group of tracks are formed during down-shifting of the azimuth-pair-head in the track-to-track intervals left in the first group of tracks. As a result, substantially high-density longitudinal recording becomes possible. This helps to make the size of the magnetic tape cassette compact without degrading recording capacity.

While the present invention has been disclosed in terms of the preferred embodiments of the invention, it should be appreciated the invention may be embodied in various ways. Therefore, various embodiments and modifications of the shown embodiments, which can be implemented without departing from the principles of the invention, should be included within the scope of the invention.

What is claimed is:

1. A parallel scanning tape recording and/or reproducing apparatus, comprising:
    a rotary head drum for guiding a magnetic tape on an outer periphery thereof;
    magnetic transducer means provided at said rotary drum so as to project from said outer periphery of said rotary head drum;
    means for periodically shifting said magnetic transducer means along an axis of said rotary head drum in order to form a plurality of recording tracks substantially parallel to a longitudinal axis of said magnetic tape; and
    means for driving said magnetic tape in both forward and reverse directions, said magnetic tape driving means, including control means for accelerating said magnetic tape for a given period from a predetermined constant speed immediately prior to stopping or reversing tape travel for shifting an end point and a start point of said recording tracks, thus to prevent overlapping of said tracks.

2. A parallel scanning tape recording and/or reproducing apparatus, comprising:
    a rotary head drum for receiving a magnetic tape on an outer periphery thereof;
    magnetic transducer means provided on said rotary head drum so as to project from said outer periphery of said rotary head drum;
    means for periodically shifting said magnetic transducer means along an axis of said rotary head drum in order to form a plurality of recording tracks substantially parallel to a longitudinal axis of said magnetic tape; and
    means for driving said magnetic tape in both forward and reverse directions and for accelerating said magnetic tape from a predetermined constant speed to a speed which is faster than said predetermined constant speed for a short period prior to reversing the running direction of said magnetic tape in response to receiving a signal for reversing said tape running direction.

3. A parallel scanning tape recording and/or reproducing apparatus as recited in claim 2, wherein said magnetic tape driving means decelerates said magnetic tape after said acceleration until said magnetic tape is stopped, and then accelerates the magnetic tape up to a speed which is faster than the predetermined constant speed in the reverse direction.

4. A parallel scanning tape recording and/or reproducing apparatus as recited in claim 3, wherein said magnetic tape driving means decelerates said magnetic tape from said accelerated speed to said predetermined constant speed after said tape is accelerated to said speed in the reverse direction.

5. A parallel scanning tape recording and/or reproducing apparatus as recited in claim 4, which further comprises an auxiliary information recording and/or reproducing means which records or reproduces tape reverse informations on or from said magnetic tape.

6. A parallel scanning tape recording and/or reproducing apparatus as recited in claim 5, wherein said auxiliary information recording and/or reproducing means is a fixed magnetic head which forms a recording track along with the longitudinal axis of said magnetic tape.

7. A parallel scanning tape recording and/or reproducing apparatus, comprising:
- a rotary head drum for guiding a magnetic tape on an outer periphery thereof;
- magnetic transducer means provided at said rotary head drum so as to project from said outer periphery of said rotary head drum;
- means for periodically shifting said magnetic transducer means along an axis of said rotary head drum in order to form a plurality of recording tracks substantially parallel to a longitudinal axis of said magnetic tape; and
- means for driving said magnetic tape in both forward and reverse directions, said magnetic tape driving means being responsive to an operation command including an order for stopping or reversing said magnetic tape and temporarily accelerating said magnetic tape for a given period from a predetermined constant speed immediately prior to stopping or reversing tape travel in response to said operation command, for shifting an end point and a start point of said recording tracks to prevent overlapping thereof.

8. A parallel scanning tape recording and/or reproducing apparatus, comprising:
- a rotary head drum for receiving a magnetic tape on an outer periphery thereof;
- magnetic transducer means provided on said rotary head drum so as to project from said outer periphery of said rotary head drum;
- means for periodically shifting said magnetic transducer means along an axis of said rotary head drum in order to form a plurality of recording tracks substantially parallel to a longitudinal axis of said magnetic tape; and
- means for driving said magnetic tape in both forward and reverse directions, said magnetic tape driving means being responsive to a stop command for accelerating said magnetic tape from a predetermined constant speed to a speed which is faster than said predetermined constant speed for a given period immediately preceding deceleration of said magnetic tape to stop in response to said stop command.

9. A parallel scanning tape recording and/or reproducing apparatus as recited in claim 8, wherein said magnetic tape driving means is responsive to an operation command ordering reversing of drive direction of said magnetic tape and temporarily accelerates the magnetic tape up to a predetermined accelerated speed which is faster than the predetermined constant speed in the reversed tape drive direction.

10. A parallel scanning tape recording and/or reproducing apparatus as recited in claim 9, wherein said magnetic tape driving means decelerates said magnetic tape from said accelerated speed to said predetermined constant speed after said tape is accelerated to said speed in the reverse direction.

11. A parallel scanning tape recording and/or reproducing apparatus as recited in claim 10, which further comprises an auxiliary information recording and/or reproducing means which records or reproduces tape reverse information on or from said magnetic tape.

12. A parallel scanning tape recording and/or reproducing apparatus as recited in claim 11, wherein said auxiliary information recording and/or reproducing means is a fixed magnetic head which forms a recording track along with the longitudinal axis of said magnetic tape.

* * * * *